(12) United States Patent
Kinsella et al.

(10) Patent No.: US 7,735,058 B2
(45) Date of Patent: Jun. 8, 2010

(54) REMOTE COMPONENT AND CONNECTION ARCHITECTURE

(75) Inventors: Kevin Kinsella, Escondido, CA (US); Roger Theodore Sumner, Solana Beach, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1316 days.

(21) Appl. No.: 11/047,132

(22) Filed: Jan. 31, 2005

(65) Prior Publication Data

US 2006/0174221 A1    Aug. 3, 2006

(51) Int. Cl.
G06F 9/44    (2006.01)
G06F 9/45    (2006.01)

(52) U.S. Cl. .............. 717/106; 717/107; 717/108; 717/109; 717/136; 717/140

(58) Field of Classification Search .............. 717/106, 717/107, 108, 109, 136, 140
See application file for complete search history.

(56) References Cited

U.S. PATENT DOCUMENTS

| | | | |
|---|---|---|---|
| 5,541,863 A | | 7/1996 | Magor et al. |
| 5,671,415 A | * | 9/1997 | Hossain ...................... 717/101 |
| 5,805,889 A | * | 9/1998 | Van De Vanter ............ 717/107 |
| 5,845,119 A | * | 12/1998 | Kozuka et al. .............. 717/107 |
| 6,067,639 A | | 5/2000 | Rodrigues et al. |
| 6,275,977 B1 | * | 8/2001 | Nagai et al. ................. 717/108 |
| 6,298,318 B1 | * | 10/2001 | Lin ............................. 703/23 |
| 6,298,474 B1 | * | 10/2001 | Blowers et al. ............. 717/104 |
| 6,405,364 B1 | * | 6/2002 | Bowman-Amuah ......... 717/101 |
| 6,434,740 B1 | * | 8/2002 | Monday et al. ............. 717/136 |
| 6,550,052 B1 | * | 4/2003 | Joyce et al. ................. 717/100 |
| 6,557,164 B1 | * | 4/2003 | Faustini ...................... 717/107 |
| 6,718,533 B1 | * | 4/2004 | Schneider et al. ........... 717/100 |
| 2002/0072360 A1 | | 6/2002 | Chang et al. |
| 2002/0091988 A1 | * | 7/2002 | Murphy ...................... 717/101 |
| 2003/0028579 A1 | | 2/2003 | Kulkarni et al. |

OTHER PUBLICATIONS

Andress, R. P. "Wholesale Byte Reversal of the Outermost Ada Record Object to Achieve Endian Independence for Communicated Data Types", 2005, Ada Letters, p. 19-27.*
Podgurski, et al. "Retrieving Reusable Software by Sampling Behavior", 1993, ACM, p. 286-303.*

(Continued)

*Primary Examiner*—Wei Y Zhen
*Assistant Examiner*—Qamrun Nahar
(74) *Attorney, Agent, or Firm*—Robert P. Lenart, Esq.; Pietragallo Gordon Alfano Bosick & Raspanti, LLP

(57) ABSTRACT

A method of developing software comprises the steps of defining a plurality of component objects for receiving input data and producing output data, defining a plurality of connection objects for passing data between the component objects, and executing an initialization script to define a behavioral model for the system by defining relationships between the component objects and the connection objects. A software development system that performs the method is also provided.

22 Claims, 2 Drawing Sheets

OTHER PUBLICATIONS

A. Varga, "The OMNeT++ Discrete Event Simulation System", Proceedings of the European Simulation Multiconference (ESM' 2001), Jun. 9, 2001, pp. 1-7.

J. B. Michael et al., "Modeling and Simulation of System-of-Systems Timing Constraints with UML-RT and OMNeT++", Proceedings of the 15th IEEE International Workshop on Rapid System Prototyping, Piscataway, NJ, Jun. 28-30, 2004, pp. 202-209.

J. A. Reed et al., "An Object-Oriented Framework for Distributed Computational Simulation of Aerospace Propulsion Systems", Proceedings of the 4th USENIX Conference on Object-Oriented Technologies and Systems, Apr. 30, 1998, pp. 1-15.

Wikipedia: "Topological Sorting", Internet Article, Jan. 26, 2005, pp. 1-2.

* cited by examiner

REMOTE COMPONENT AND CONNECTION ARCHITECTURE

FIELD OF THE INVENTION

This invention relates to computer software systems, and more particularly, to such systems including multiple objects, which may be implemented in separate locations and can interface with hardware components.

BACKGROUND OF THE INVENTION

Software development is a significant component of both the cost and schedule of the development of unmanned air vehicle systems. Three types of software are required to implement and validate an Unmanned Autonomous Vehicle (UAV) program: the Operational Flight Program (OFP), the Closed Loop Simulation (CLS) and the Test Environment. Unfortunately, very little software is reused from one UAV program to the next. Not only is the OFP often redeveloped from scratch, but also the CLS environment and the software testing environments are all "reinvented" on a program-by-program basis resulting in little consistency, lower quality, and higher costs.

OFP development strategy traditionally aims toward the implementation of a single instance of a large executable program that resides in a specific single target computer using cross-compilation tools. This preconception unnecessarily results in artificial obstacles in the software development process, such as the prerequisite delivery of specialized hardware and/or development tools before any practical software testing can be performed, with the additional possibility that undesirable and undetectable system timing dependencies may be embedded in OFP source code.

The current method for developing flight software places constraints on the software developers by requiring them to develop pieces of the OFP code from scratch on their desktop and then wait until the flight computers are ready on a hot bench before they can do verification and validation. Traditionally, the hot bench becomes a choke point for the schedule as many developers all vie for access to this precious resource. This requires a substantial investment in a hot bench, with a flight computer for each instance of the OFP. This in turn leads to schedule delays, cost overruns, and a lesser quality product as typically two shifts are run.

There is a need for a system for developing software more efficiently.

SUMMARY OF THE INVENTION

This invention provides a method of developing software comprising the steps of defining a plurality of component objects for receiving input data and producing output data, defining a plurality of connection objects for passing data between the component objects, and executing an initialization script to define relationships between the component objects and the connection objects.

Each of the component objects defines a run method for processing the input data to produce the output data, and each of the component objects operates at a defined run rate. A dispatch manager calls each of the component objects in accordance with the run rate of the component objects. The connection objects can be controlled to view a signal, perturb a signal, or inject a fault.

The component objects can represent a hardware component or a software component of a flight control system. The connection objects contain one or more scalar connections for passing single data elements, vector connections for passing arrays of data, and/or stream connections for passing sequences of similar data.

Control of data flow timing between the component objects can be established by a topological sort. The topological sort can be made using a directed acyclic graph of the component objects by run rate and connection type. The component objects and the connection objects can be sorted by component object run rate, component object type, and connection object type.

In another aspect, the invention encompasses a software development system comprising a computer for executing an initialization script to define relationships between a plurality of component objects and a plurality of connection objects, wherein the component objects receive input data and produce output data and the connection objects pass data between the component objects.

DETAILED DESCRIPTION OF THE INVENTION

The software architecture of this invention is derived from the application of an object-based approach to model any unmanned system such as an unmanned aircraft. The objects are connected in a structure that represents a model of the system. The model is achieved by writing an initialization script, which creates specified system components and establishes the connections between them. A "component" object is an object that takes input data and produces output data, while a "connection" object is the means of passing data from one component to another. A connection allows the user to view a signal, perturb a signal, or inject a fault.

A component can represent a hardware or software component of a flight system. It can be as simple as a single switch or relay, and it can be as complicated as a complete vehicle management computer. Components exist only to receive inputs and generate outputs, and do not need to know what is providing the inputs or what is using the outputs. Connection objects are simply point-to-point connections between components and represent the physical means of transferring data. In one embodiment of the invention, three connection classes were created to simulate the wide range of possible connection types. "Scalar" connections pass single data elements, "Vector" connections pass arrays of data, and "Stream" connections pass sequences of data. Examples of scalar values are: the outside air temperature, the fuel level, or the position of a control surface. Examples of vector values are: the position of the vehicle in space, or the attitude of a sensor. Stream values can be, for example, image outputs from sensors such as a Synthetic Aperture Radar (SAR) or measurements from a sensor transmitted over an asynchronous serial port.

Figure 1:
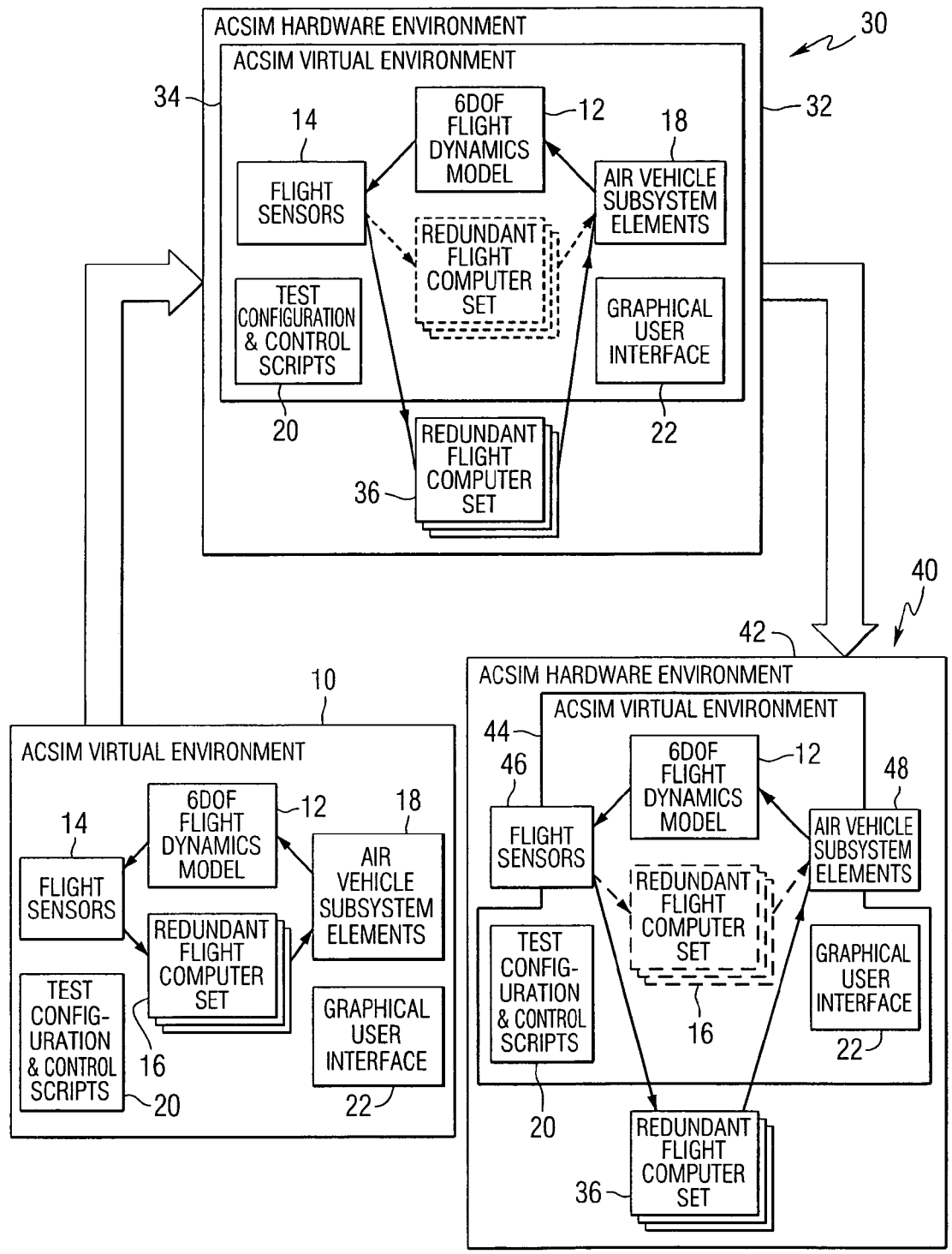
FIG. 1 is a block diagram illustrating a life cycle of a software development system in accordance with this invention.

Referring to the drawings, FIG. 1 is a block diagram that can be used to describe the invention. For the purposes of this description, the invention will be described as it can be applied to the development of an unmanned aircraft control system. However, it should be understood that the invention is applicable to other systems as well, including space, ground, marine and cyberspace based systems. In FIG. 1, block 10 represents an Automated Component Simulation (ACSIM) virtual environment that can be used to provide virtual testing of the system in simulated flight with time being either equal to, faster than or slower than real time. The ACSIM virtual environment can be implemented on a single laptop PC. The virtual environment includes a flight dynamics module 12, one or more flight sensors 14, a set of redundant flight controllers (computers) 16, and one or more of air vehicle subsystem elements 18. At this point in the system development, all of the system elements are simulated in software. Each of these elements is implemented as a component object. A plurality of connection objects are used to specify the permitted interactions between the components. A test configuration and control script 20 is used to control the configuration of components and connections and hence the interactions between the components. A graphical user interface 22 is provided for communication with the system. The virtual environment can be used to simulate the air vehicle control system in non-real time.

Components may be developed in any object oriented language that facilitates code re-use by inheritance and polymorphic behavior. A component will define its inputs and their enumerated types, a run method that performs some calculation on these inputs to generate defined outputs, and a run rate at which the component should be activated. The initialization script will register components with a dispatch manager component to execute at a specific run rate (for example: 400 Hz, 100 Hz, 50 Hz, 20 Hz, 1 Hz, ⅕ Hz, etc). Connections between components are specified in the initialization script which is executed once immediately prior to run time. Control is implemented at two levels. The first level of control is in the run method of a component, where for each of the component's inputs the component calls the get method for whatever is connected to its inputs (for example from another component or a connection) as defined by the control script. Then the component updates its outputs by calling its own put methods. The second level of control is for a component which is connected to a sensor (or in this case, a simulated sensor). The get method is first called to obtain the latest raw sensor data, then the get method for other redundant sensors are called via a signal comparator component (a component type that performs filtering on raw sensor data) to obtain the other filtered values, finally the output of the component is updated by calling its own put method.

The components connected to a raw sensor have their run methods called at a fundamental frame rate ("heartbeat") or some multiple thereof. For example, if the fundamental frame rate is 400 Hz, then all components with a rate of 400 Hz have their run methods called at every fundamental frame (once every 2.5 ms), while the components with a rate of 100 Hz have their run methods called every $4^{th}$ fundamental frame (400 modulo 100), components with a rate of 50 Hz have their run methods called every $8^{th}$ fundamental frame (400 modulo 50) and so on.

Block 30 represents a stage of the system development in which the virtual environment interfaces with flight computer hardware. Outer block 32 represents hardware and inner block 34 represents the virtual automated component simulation test engineering (ACSIM) environment. At this stage, hardware in the form of a redundant flight computer set illustrated by block 36 is connected to the virtual flight sensors and the virtual air vehicle subsystem elements. The configuration of block 30 includes the flight computer as hardware-in-the-loop, and permits partial real time testing of the system. The virtual flight computer 16 could be used at this stage, but it is not necessary.

Block 40 represents a stage of the system development in which the virtual environment interfaces with additional hardware for hot bench hardware-in-the-loop testing. Outer block 42 represents hardware and inner block 44 represents the virtual automated component simulation test engineering (ACSIM) environment. At this stage, the flight sensors 46 and air vehicle subsystems 48 are implemented in hardware. This testing would be performed in real time. The virtual flight computer 16 could be used at this stage, but it is not necessary.

Figure 2:
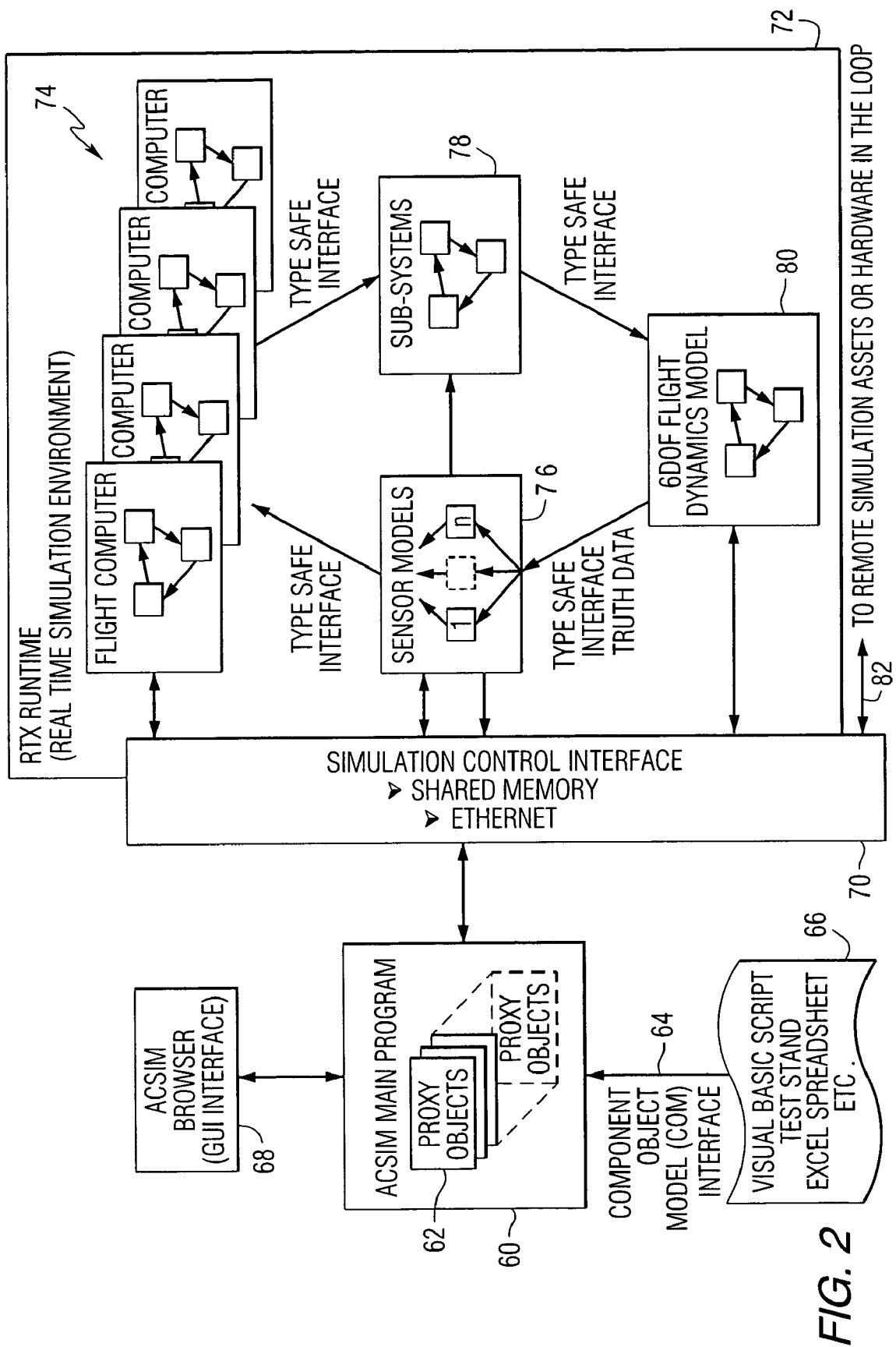
FIG. 2 is a block diagram illustrating a software simulation environment.

FIG. 2 is a block diagram showing another embodiment of the invention, which includes a Remote Component and Connection Architecture having a multiple object hierarchy accessible via a web browser. A main ACSIM program 60, which includes a plurality of proxy objects 62 receives data from a component object model interface 64 that is coupled to a visual basic script test stand, spreadsheet, or other data source 66. A graphical user interface 68, which can include a ACSIM browser is provided for user inputs to the ACSIM main program. The ACSIM main program is coupled to a simulation control interface 70, which can be an Ethernet that is coupled to a shared memory. The simulation control interface is in turn coupled to a real time simulation environment illustrated by block 72. The real time simulation environment includes a plurality of flight computers identified as item 74 that interface with a plurality of sensor modules 76 and subsystems 78. The sensor modules 76 and subsystems 78 also interface with a flight dynamics model 80. The simulation control interface can also be connected to remote simulation assets or hardware in the loop as shown by arrow 82.

Active X technology can be used to connect ("wire") the various system components via a startup script at runtime. Any combination of software and hardware components may be connected at runtime. Components may be remotely located on other machines. This invention is applicable to both simulated and real Unmanned Autonomous Vehicles (UAVs).

The invention can further provide a method to synchronize the flow of data between software components in an autonomous software system in order to guarantee stable input and output data. The control of data flow timing between components is established and guaranteed at run time by a topological sort. The topological sort can be made by a Directed Acyclic Graph (DAG) of the components by frame run rate and connection type.

A synchronization algorithm evaluates the component and connection topology (as specified in the startup script) and sorts the objects by component run rate, component type, and connection type to guarantee stability of data both interframe and intraframe. Intraframe data is data that passes between two components having the same run rate (for example, a 50 Hz component to another 50 Hz component), and interframe data is data that passes between two components of different run rates (for example, a 50 Hz component to a 10 Hz component).

When used in the context of an unmanned aircraft system, the Remote Component and Connection Architecture permits the single instance of the OFP executable software to be broken into reusable fundamental components. It allows the components to be assembled at run time via a script and executed in part or in whole. The execution can be decoupled from both the target hardware and other software components such that it can run on any desktop or laptop computer. Additionally, software components may also be decoupled from each other to run on different computers.

The method not only allows the fundamental components to be assembled into a single OFP component and virtually flown on either a personal computer or the final flight computer, but multiple OFP components can be assembled into a redundant flight control virtual air vehicle and virtually flown on a personal computer. In addition, components may be remotely distributed and run on multiple PCs.

This invention permits the standalone development and test of software independent of any and all associated flight hardware in four distinct modes:

1. Single—An individual software component may be developed, instantiated and tested standalone on a PC, for example the Air Data computer software unit (CSU).

2. Partial—A collection of software components representing a subset of the final OFP may be developed, instantiated and tested standalone on a PC, for example the Air Data CSU, Navigation CSU and Flight Control Surface CSU.

3. All—All software components may be assembled into the final OFP component, tested, and virtually "flown" standalone on a PC, or on the real flight computer on a hot bench.

4. Multiple—Multiple OFP components may be assembled into a desired vehicle configuration: simplex, duplex, triplex or quad (one, two, three or four flight computers) and virtually "flown" standalone on a personal computer.

The method of this invention can be incorporated in a flexible object based software environment designed to support the development, test and integration of redundant fault tolerant flight computer software. The software environment can be a deterministic periodic execution environment, which can be run in real time or non-real time. In a preferred software environment, the main software executable may also be hosted on a single personal computer on the desktop of an individual programmer. This allows members of a software development team to use the virtual environment (including the virtual flight computer component running the Operational Flight Program) for software testing in a location of their choosing (customer site, tradeshow, etc). The availability of flight computer hardware assets is no longer a roadblock to the early testing of flight software elements.

The invention utilizes two basic classes of objects, components and connections, to fully support system testing in both an entirely simulated environment and in traditional environments incorporating significant levels of "hardware-in-the-loop." By modeling the system of interest in terms of components and connections, the invention provides the ability to make rapid reconfigurations in the test environment ranging from a single test case to the full air vehicle configuration, without a recompile or build.

Once the initialization script for a modeled system has been run to create and connect the components, a topological sort is performed on components by frame run rate and connection type to provide synchronization of data between components. This ensures proper timing of the data flow between components and guarantees that inputs to a computational unit (component) are stable and valid before they are used. Data types are also checked to ensure a valid connection.

System timing dependencies are removed from the OFP source code and established at connect time via a startup script. While the prior art required detailed knowledge and modification of source code to effect a data flow change in the system model, the method of this invention only requires knowledge of the system model.

Active components are controlled through a fixed rate activation sequence ordered by their creation in the initialization script. For example, the topological sort can correctly set up data flow through the components "connected" for a 50 Hz loop to control the position of control surfaces. The data flow generated by the sort could be as follows. On a 50 Hz frame N, an air transducer component generates static and dynamic air pressure outputs to the navigation component, which then generates position outputs on frame N+1 to the aircraft control surfaces, which then generate outputs on frame N+2 to the 6DOF Flight Dynamics Component, which generates new truth data on frame N+3 back to the air transducer, closing the loop.

A modeled system will include both active and passive components. The difference between the two is that an active component is explicitly "Run" (via a "Run" method) to cause it to examine inputs and generate new outputs that are sent via connections to other components. A passive component is triggered by a changing input value. In practice only very simple components, such as a temperature transducer, can be implemented as a passive component.

The method of this invention will allow software developers to begin with known validated software components that they have previously validated. Additionally, the software developers may all work in parallel to design, test, fly, and validate a new component on their own laptop. This work may proceed without regard for what the flight computer(s) will be, when they will be available, or the operating systems that will control them.

The invention allows code reuse from one Unmanned Autonomous Vehicle (UAV) to the next, which will reduce software development time. By being able to begin software development in parallel from a previously validated baseline library of components, a new UAV project can effectively manage risk and shrink the time to first flight. This approach is designed to be independent of the air vehicle's lift and propulsion methods, for applications ranging from marine, terrestrial, atmospheric, space and cyberspace.

The benefits of this new approach are that significant cost and schedule savings will be realized by allowing program specific UAV software to be developed, tested and verified before any flight hardware is delivered or any systems integration capital facilities are built. The target run time environment can be a deterministic periodic execution environment of any fundamental frame rate. It is within this environment that OFP software components can be developed and either (a) tested in an automated or manual fashion, or (b) aggregated into a full-up OFP that can be tested and "flown" in a virtual environment on a laptop with no hardware in the loop.

There is no operating system preference and the OFP code is not required to use any operating system dependent constructs, except that hardware partitioning can be used for the purpose of separating flight and mission critical code into separate memory partitions.

The OFP developed with this invention can be DO-178B certifiable. This is accomplished by porting the software environment to one or more commercial run time operating systems that are able to provide hardware partitioning. DO-178B certification is not required, but applicable DO-178B tailored processes can be used where the quality of the end product would significantly benefit without undue costs. In one embodiment of the invention, an ARINC-653 Application Program Interface (API) is assumed as a minimal baseline capability.

The invention will support operation from simplex to quadruplex computer configurations. The OFP can be payload-independent and any payload-specific software can be relegated to a separate partition or processor. The final software product is inherently portable, particularly for the "core services", and therefore applicable to any platform.

Software testing can include automated unit tests (test harnesses) for each "component", and can support scalable configurations up to and including full hardware-in-the-loop testing.

The software can be implemented in any object oriented language which is designed to capitalize on code re-use (the C++ and Java languages are representative of the state of the art at the time of this writing). For example, computer software units (CSUs) written in C++ that are used unchanged, can be compiled with a C++ compiler to allow nominal modifications for fault logging, etc., to be utilized.

The ability to test a warm restart capability by simulating a crash of one of the virtual flight computers in mid-flight and then testing its ability to automatically re-synchronize with the other virtual flight computers is supported by enabling components to save internal states and calling a restore method. Additionally, the ability to initially start a virtual flight computer in a mid-flight condition (as opposed to starting it on the ground and virtually "flying" it to the mid-flight condition) for the purpose of testing a specific failure is also supported by the same means.

This invention can be used to develop and fly an unmanned system comprised of one to four virtual flight computers in any physical location (such as a customer site, tradeshow, or during travel). The invention can be implemented on a commercially available laptop personal computer running Windows. No Operating System for the virtual flight computer is required. Failure conditions can be inserted and monitored in real time via a web browser or any Active X capable scripting language engine. No specialized development tools are required.

While the present invention has been described in terms of its presently preferred embodiments, it will be apparent to those skilled in the art that various changes can be made to the disclosed embodiments without departing from the scope of the invention as defined by the following claims.

What is claimed is:

1. A computer implemented method of developing software comprising the steps of:
   defining a plurality of component objects for receiving input data and producing output data, wherein each of the component objects defines a run method for processing the input data to produce the output data and operates at a defined run rate;
   defining a plurality of connection objects for passing data between the component objects; and
   executing an initialization script to define relationships between the component objects and the connection objects, and to register the component objects with a dispatch manager component to execute at a specific run rate, wherein the dispatch manager component calls each of the component objects in accordance with the run rate of the component objects.

2. The method of claim 1, further comprising the step of:
   controlling one or more of the connection objects to view a signal, perturb the signal or inject a fault.

3. The method of claim 1, wherein:
   each of the component objects represents a hardware component or a software component of a flight control system.

4. The method of claim 1, wherein the connection objects comprise one or more of:
   scalar connections for passing single data elements;
   vector connections for passing arrays of data; and
   stream connections for passing sequences of similar data.

5. The method of claim 1, wherein:
   control of data flow timing between the component objects is established by a topological sort.

6. The method of claim 5, wherein:
   the topological sort is made using a directed acyclic graph of the component objects by run rate and connection type.

7. The method of claim 5, wherein:
   the component objects and the connection objects are sorted by component object run rate, component object type, and connection object type.

8. The method of claim 1, wherein:
   the component objects are controlled through a fixed rate activation sequence ordered by a creation of the component objects in the initialization script.

9. The method of claim 1, wherein:
   the component objects are run in a deterministic periodic execution environment.

10. The method of claim 1, wherein:
    the component objects are decoupled from each other to run on different computers.

11. The method of claim 1, further comprising the steps of:
    saving internal states of the component objects; and
    calling a restore method to restart the software.

12. A software development system comprising:
    a computer including a processor for executing an initialization script to define relationships between a plurality of component objects, each defining a run method for processing input data to produce output data and operating at a defined run rate, and a plurality of connection objects, wherein the initialization script registers the component objects with a dispatch manager component to execute at a specific run rate, wherein the dispatch manager component calls each of the component objects in accordance with the run rate of the component objects, the component objects receive the input data and produce the output data, and the connection objects pass data between the component objects.

13. The system of claim 12, further comprising:
    an interface for controlling one or more of the connection objects to view a signal, perturb the signal or inject a fault.

14. The system of claim 12, wherein:
    each of the component objects represents a hardware component or a software component of a flight control system.

15. The system of claim 12, wherein the connection objects comprise one or more of:
    scalar connections for passing single data elements;
    vector connections for passing arrays of data; and
    stream connections for passing sequences of similar data.

16. The system of claim 12, wherein:
    control of data flow timing between the component objects is established by a topological sort.

17. The system of claim 16, wherein:
    the topological sort is made using a directed acyclic graph of the component objects by run rate and connection type.

18. The system of claim 16, wherein:
    the component objects and the connection objects are sorted by component object run rate, component object type, and connection object type.

19. The system of claim 12, wherein:

the component objects are controlled through a fixed rate activation sequence ordered by a creation of the component objects in the initialization script.

20. The system of claim 12, wherein:

the component objects are run in a deterministic periodic execution environment.

21. The system of claim 12, wherein:

the component objects are decoupled from each other to run on a same or different computers.

22. The system of claim 12, further comprising the steps of:

saving internal states of the component objects; and calling a restore method to restart a software.

* * * * *